United States Patent
Papulski et al.

(10) Patent No.: US 11,680,682 B2
(45) Date of Patent: *Jun. 20, 2023

(54) OVERLOAD CONTROL DEVICE FOR ROTATING MACHINERY

(71) Applicant: Taylor Tools, Denver, CO (US)

(72) Inventors: Keith Papulski, Morrison, CO (US); Thomas P. Karnowka, Bailey, CO (US)

(73) Assignee: Taylor Tools, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,448

(22) Filed: Nov. 3, 2021

(65) Prior Publication Data
US 2022/0057045 A1 Feb. 24, 2022

Related U.S. Application Data

(63) Continuation of application No. 16/192,438, filed on Nov. 15, 2018, now Pat. No. 11,187,377.

(51) Int. Cl.
*H02P 3/00* (2006.01)
*F16P 3/00* (2006.01)
*B08B 1/00* (2006.01)

(52) U.S. Cl.
CPC ............... *F16P 3/00* (2013.01); *B08B 1/005* (2013.01); *H02P 3/00* (2013.01)

(58) Field of Classification Search
CPC ............ H02P 3/00; B08B 1/005; F16P 3/00
See application file for complete search history.

(56) References Cited

U.S. PATENT DOCUMENTS

| | | | |
|---|---|---|---|
| 4,757,566 A * | 7/1988 | Field ................. | A47L 11/4066 |
| | | | 15/49.1 |
| 5,615,437 A | 4/1997 | Takahashi et al. | |
| 5,698,957 A | 12/1997 | Sowada | |
| 6,042,656 A | 3/2000 | Knutson | |
| 6,105,192 A | 8/2000 | Deiterman et al. | |
| 6,227,957 B1 | 5/2001 | Legatt et al. | |
| 6,231,432 B1 * | 5/2001 | Peterson ............. | A47L 11/164 |
| | | | 15/49.1 |
| 6,614,195 B2 | 9/2003 | Bushey et al. | |
| 7,013,527 B2 | 3/2006 | Thomas et al. | |
| 7,038,416 B2 | 5/2006 | Erko et al. | |

(Continued)

*Primary Examiner* — Rina I Duda
(74) *Attorney, Agent, or Firm* — Perkins Coie LLP

(57) ABSTRACT

An overload control device for use with a floor machine having an electric motor is disclosed. The overload control device can include a power input and a power output connectable to the electric motor. The device can include a load detector, a current sensor operative to sense a current value supplied to the motor via the power output, and a cutoff relay interconnecting the power input and the power output. The cutoff relay being operative to supply power from the power input to the power output when activated, and interrupt power when deactivated. A controller receives a load present indication from the load detector and activates the cutoff relay if a load is present. The controller receives a current value from the current sensor, determines if the current value is greater than a threshold value, and deactivates the cutoff relay when the current value is greater than the threshold value.

20 Claims, 8 Drawing Sheets

(56) References Cited

U.S. PATENT DOCUMENTS

| | | | |
|---|---|---|---|
| 8,028,365 B2* | 10/2011 | Field | A47L 11/4088 |
| | | | 15/230.14 |
| 8,029,739 B2 | 10/2011 | Field et al. | |
| 9,193,055 B2 | 11/2015 | Lim et al. | |
| 2005/0236012 A1* | 10/2005 | Josefsson | A47L 11/4083 |
| | | | 134/1 |
| 2005/0254185 A1* | 11/2005 | Cunningham | A47L 9/2842 |
| | | | 361/23 |
| 2008/0284363 A1* | 11/2008 | Lucas | A01D 34/78 |
| | | | 318/441 |

\* cited by examiner

OVERLOAD CONTROL DEVICE FOR ROTATING MACHINERY

CROSS-REFERENCE TO RELATED APPLICATION

This application is a continuation of U.S. patent application Ser. No. 16/192,438, filed Nov. 15, 2018, the disclosure of which is incorporated herein by reference in its entirety.

TECHNICAL FIELD

This patent application is directed to overload control devices, and more specifically, to overload control devices for rotating machinery.

BACKGROUND

Industrial floor scraping machines (e.g., rotating machinery) often use a rotating disc with blades mounted on the disc to clean up a surface prior to installation of new flooring. In one example, a floor scraping machine can include a 1.5 horsepower electric motor spinning a 15 inch diameter disc having carbide blades with a forward attack angle. When these blades encounter a crack or expansion joint in the floor, the disc's rotation is halted transferring a large amount of torque to the operator before the operator can release the machine. Therefore, a need exists to protect operators of rotating machinery, such as floor scraping machines, from forces resulting from the sudden stop of rotating components.

BRIEF DESCRIPTION OF THE DRAWINGS

The overload control devices described herein may be better understood by referring to the following Detailed Description in conjunction with the accompanying drawings, in which like reference numerals indicate identical or functionally similar elements.

Figure 1:
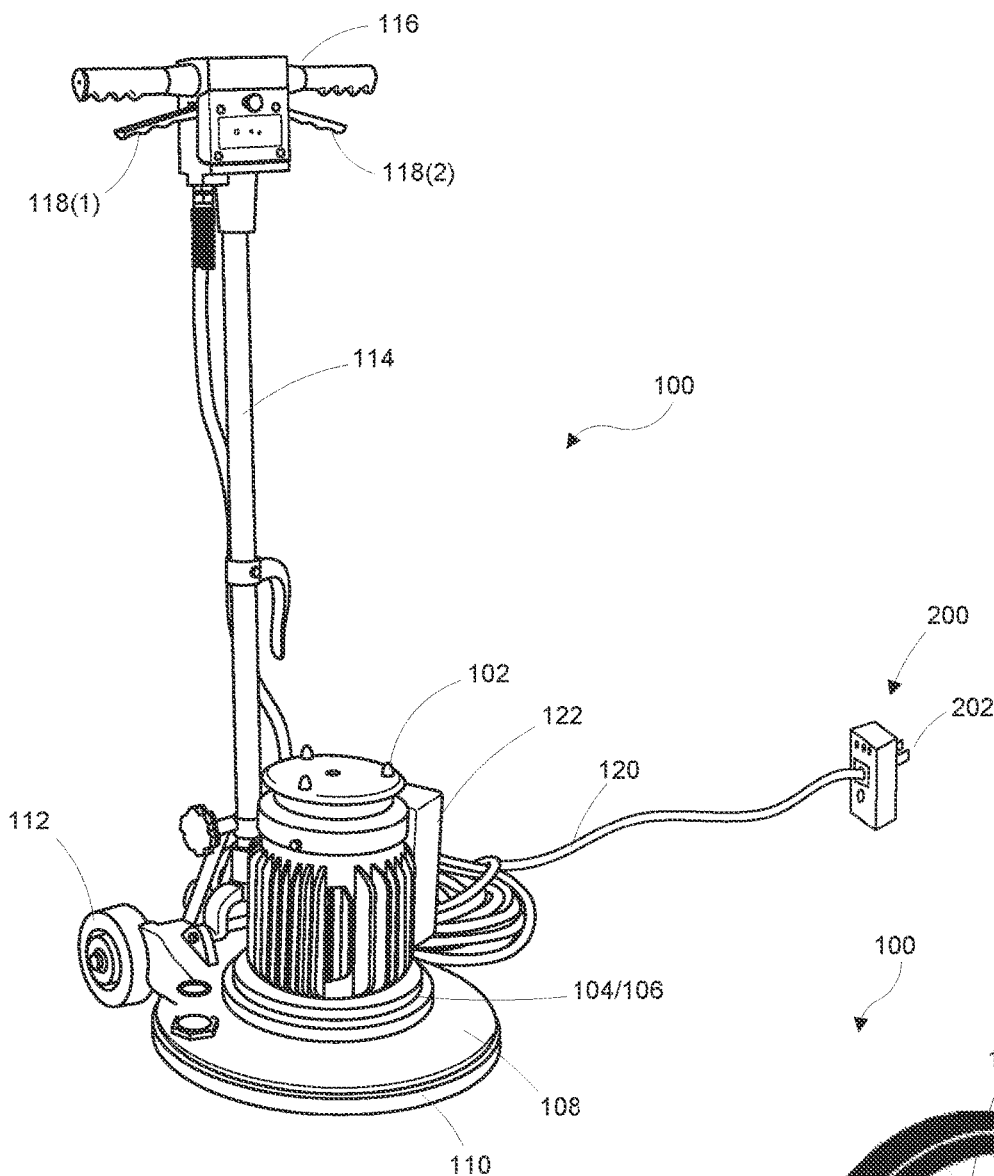
FIG. 1 is a perspective view of an industrial floor scraper according to a representative embodiment.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

Disclosed herein are current overload control devices for use with rotating machinery, such as industrial floor scraping machines. The disclosed devices sense current spikes exceeding a user adjustable threshold (e.g., 40 amps) and interrupt the power to the machine's motor via a relay in a matter of microseconds. The disclosed devices can account for motor start-up with a ~0.5 second delay, for example. In some embodiments, once the overload control device trips, the operator must release the machine's safety handles or triggers (i.e., turn off the machine) for at least 5 seconds in order to reset the device and continue running the machine. The device can be configured as a stand-alone plug-in wall unit or it can be incorporated into the machine.

Industrial floor scraping machines (e.g., rotating machinery) often use a large rotating disc with aggressive blades mounted on the disc to clean up a surface prior to installation of new flooring. When these blades encounter a crack or expansion joint in the floor, the disc's rotation is halted transferring a large amount of torque to the operator before the operator can stop the machine. Thus, the motor remains under power until the operator can release the safety stop lever(s) located on the handle grip, which can result in multiple impacts releasing large amounts of torque to the operator. The disclosed overload control devices can immediately cut power to the machine's motor after the first impact, thereby preventing the additional transfers of torque (i.e., impacts) to the operator.

FIG. 1 illustrates a floor scraping machine 100 according to a representative embodiment. The floor scraping machine 100 can include an electric motor 102 mounted on a deck plate 108. In some embodiments, the motor 102 can be coupled to a gear box 104 to rotate a removable disc 110. In some embodiments, the motor 102 directly drives the disc 110. In some embodiments, a motor brake 106 can be located on top of the motor (e.g., the other end of the motor's drive shaft), which can stop the motor's rotation in less than one revolution, for example. A handle assembly 114 extends away from the electric motor 102 and can be attached to the deck plate 108. The handle assembly 114 can include a handlebar 116 and a pair of operating triggers or safety handles 118(1) and 118(2) (collectively triggers 118). In some embodiments, the floor machine 100 can include a pair of wheels 112 mounted to the deck plate 108 to facilitate transporting the machine. The floor machine 100 can include a power cable 120 connected to the electric motor 102.

The floor scraping machine 100 also includes an overload control device 200. In some embodiments, the power cable 120 can be attached to (e.g., wired into) the overload control device 200 as depicted in FIG. 1. In some embodiments, the power cable 120 can be removably connected to the overload control device 200 via a power output receptacle 206 (see FIG. 3) in a similar manner as connecting a conventional power cord plug into a conventional wall outlet. The overload control device 200 can include a power input plug 202 for connection to a power source, such as a wall outlet. In other embodiments, some or all of the various components of the overload control device described herein can be located on the floor scraping machine 100. For example, the overload control device can be combined with a motor controller 122 and/or the handle assembly 114.

Figure 2:
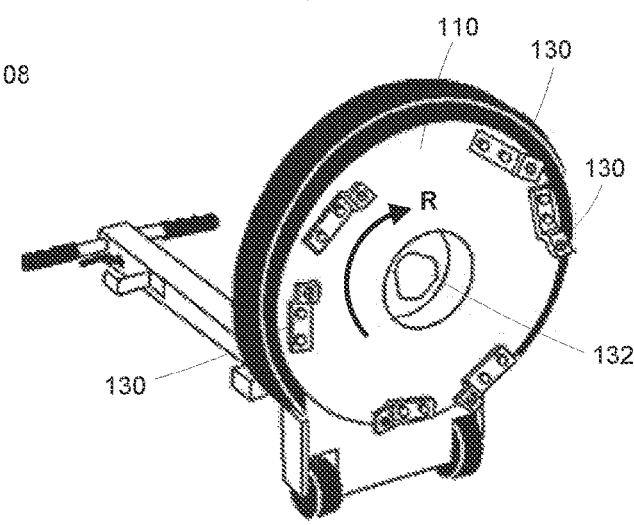
FIG. 2 is a perspective view of the rotating disc and blades of the floor scraper shown in FIG. 1.

As shown in FIG. 2, the floor scraping machine 100 can include multiple blades 130 mounted on the disc 110. In one example, the blades 130 comprise carbide blades with a forward attack angle, i.e., facing the direction of rotation R. In some embodiments, the floor machine 100 includes a hub 132 to connect the electric motor 102 to the disc 110.

Figure 3:
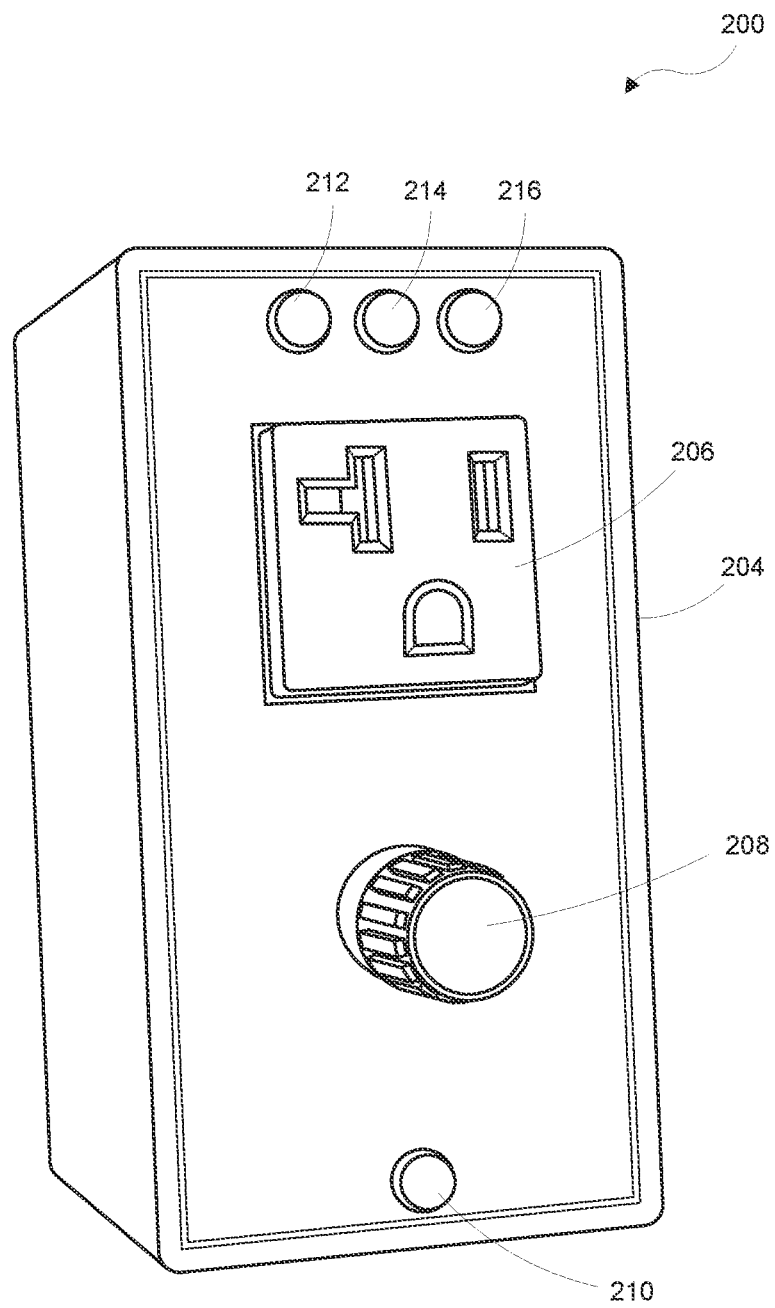
FIG. 3 is a perspective view of an overload control device according to a representative embodiment.

As shown in FIG. 3, the overload control device 200 can include an enclosure 204 for housing the various components of the device. For example, in the depicted embodiment, the overload control device 200 includes a power output receptacle 206, such as a NEMA 5-20R receptacle, as shown. In some embodiments, the enclosure 204 houses various indicators (e.g., LED lights), such as an overload indicator 210 and status indicators 212, 214, and 216, which are explained further below with respect to FIGS. 8A and 8B. In some embodiments, the overload control device 200 can include a potentiometer 208 for overcurrent limit or threshold adjustment.

Figure 4:
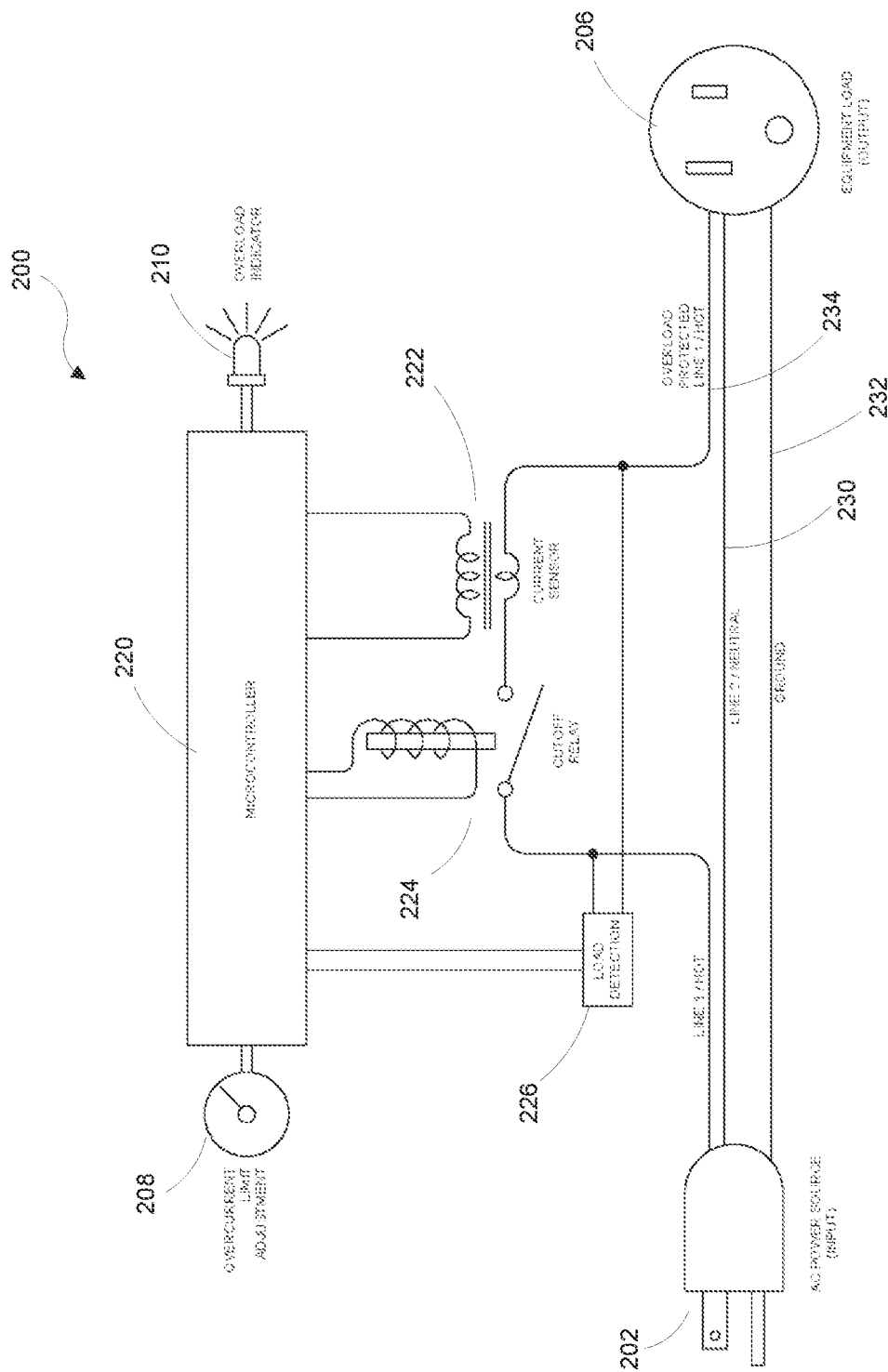
FIG. 4 is a block diagram of the overload control device shown in FIG. 3.

With further reference to FIG. 4, the overload control device 200 includes the power input 202 connectable to a power source and the power output 206 connectable to a load (e.g., the electric motor 102). It should be understood that a power source can include a wall outlet, battery, solar panel, generator, or any other suitable source of electrical power. In some embodiments, the neutral and ground lines 230 and 232, respectively, can be directly connected between the input 202 and the output 206 with the hot line 234 connected between the input and output via a cutoff relay 224. The cutoff relay 224 is operative to supply power from the power input 202 to the power output 206 when activated, and interrupt power supplied from the power input 202 to the power output 206 when deactivated.

The overload control device 200 can also include a load detector 226 operative to sense when a load is present on hot line 234 and a current sensor 222 operative to sense a current value supplied to the load via the hot line 234 and the power output 206. A controller 220, such as a microcontroller or processor, receives input from the load detector 226, the current sensor 222, and the overcurrent limit adjustment 208 in order to control the cutoff relay 224 and the overload indicator 210. The controller 220 can include instructions (e.g., can be programmed) for controlling the overload control device 200.

Figure 5:
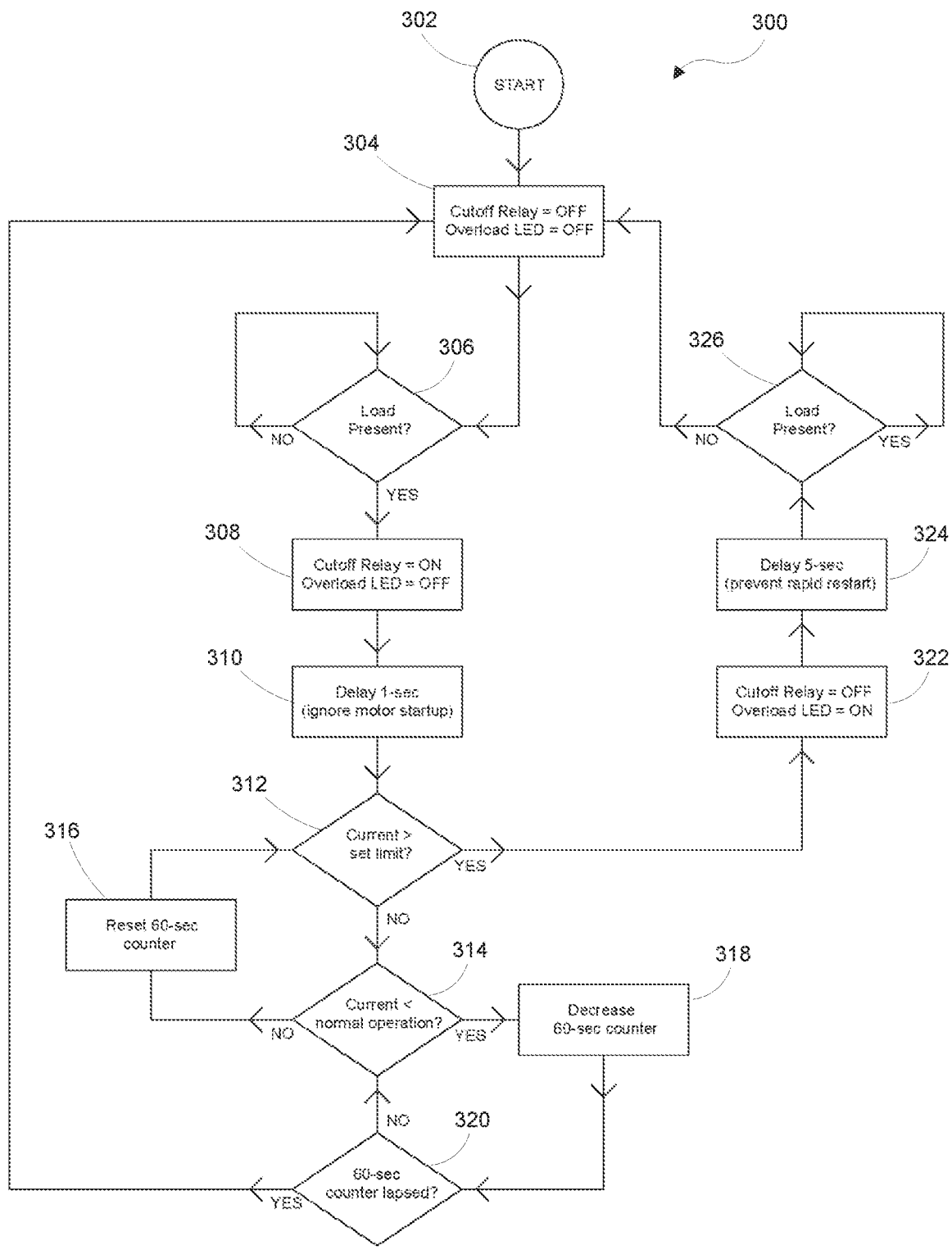
FIG. 5 is a flow chart illustrating representative steps for controlling an overload control device.

FIG. 5 is a flow diagram showing a representative method of operation 300 of the processor-based overload control device 200 according to some embodiments of the present technology. This method can be stored in any data storage device, e.g. a memory device or a controller or processor's on-chip memory. The method 300 starts at 302. For example, the method 300 can start in response to plugging the overload control device 200 into a power source (e.g., a wall outlet). At 304, the controller 220 can ensure that the cutoff relay 224 is deactivated and the overload indicator 210 is turned off. At 306, the controller 220 can receive a load present indication from the load detector 226. This step checks if the operator has turned on the floor machine by engaging the operating triggers 118 (FIG. 1) (i.e., closing the motor circuit). If no load is present, the method continues to check for a load at 306. Once a load is detected, the controller activates the cutoff relay 224 to provide power to the motor at 308. The overload indicator 210 remains off at this step. At 310, the controller delays approximately one second (startup delay period) to allow the motor to start before beginning to monitor the current flowing to the load. At 312, the controller 220 receives a current value from the current sensor 222 and determines if the current value is greater than a selected threshold value or set limit (e.g., ~40 amps). As noted above, the threshold value is user selectable with the overcurrent limit adjustment potentiometer 208. When the blades of a floor scraping machine, for example, encounter a crack, the rotating disc and motor can suddenly stop. This sudden stop is accompanied by a corresponding current spike.

At 322, the controller deactivates the cutoff relay 224 when the current value is greater than the selected threshold value (i.e., a current spike) and turns on the overload indicator 210. Once power to the motor is cut, the motor and disc stop rotating due to friction. In some embodiments, the floor scraping machine can have a 10:1 gear reduction, for example, which can also quickly slow the motor and disc. In some embodiments, the floor scraping machine can include a brake that is activated at 322 to stop the rotating components.

At 324, the controller 220 delays approximately five seconds (restart delay period) to prevent an unintended rapid restart of the floor machine. At 326, the controller can receive a load present indication from the load detector 226. This step requires the operator to release the operating triggers 118 before continuing to operate the machine. If a load is present, the method continues to check for a load at 326. Once the load is no longer detected, the method moves back to step 304.

Returning to step 312, if the current value is less than the selected threshold value, the controller 220 determines, at 314, whether or not the current value is less than a predetermined normal operating value (e.g., ~15 Amps). This step determines whether or not the floor machine is running normally or if the operator has shut down the machine (e.g., released triggers 118). If the current value is greater than the normal value, the controller 220 continues to monitor the current value against the selected threshold value at 312. If the current value is less than the normal value, the controller 220 waits approximately 60 seconds (shutdown delay period) before deactivating the cutoff relay 224 at step 304; thus, the system 300 goes into an idle mode. The method 300 can use a 60 second counter that is incrementally decreased at 318 as long as the current value is less than the normal value. Once the counter expires at 320 the method moves to step 304. If during the countdown process the current returns to normal operation, the counter is reset at 316.

Figure 6:
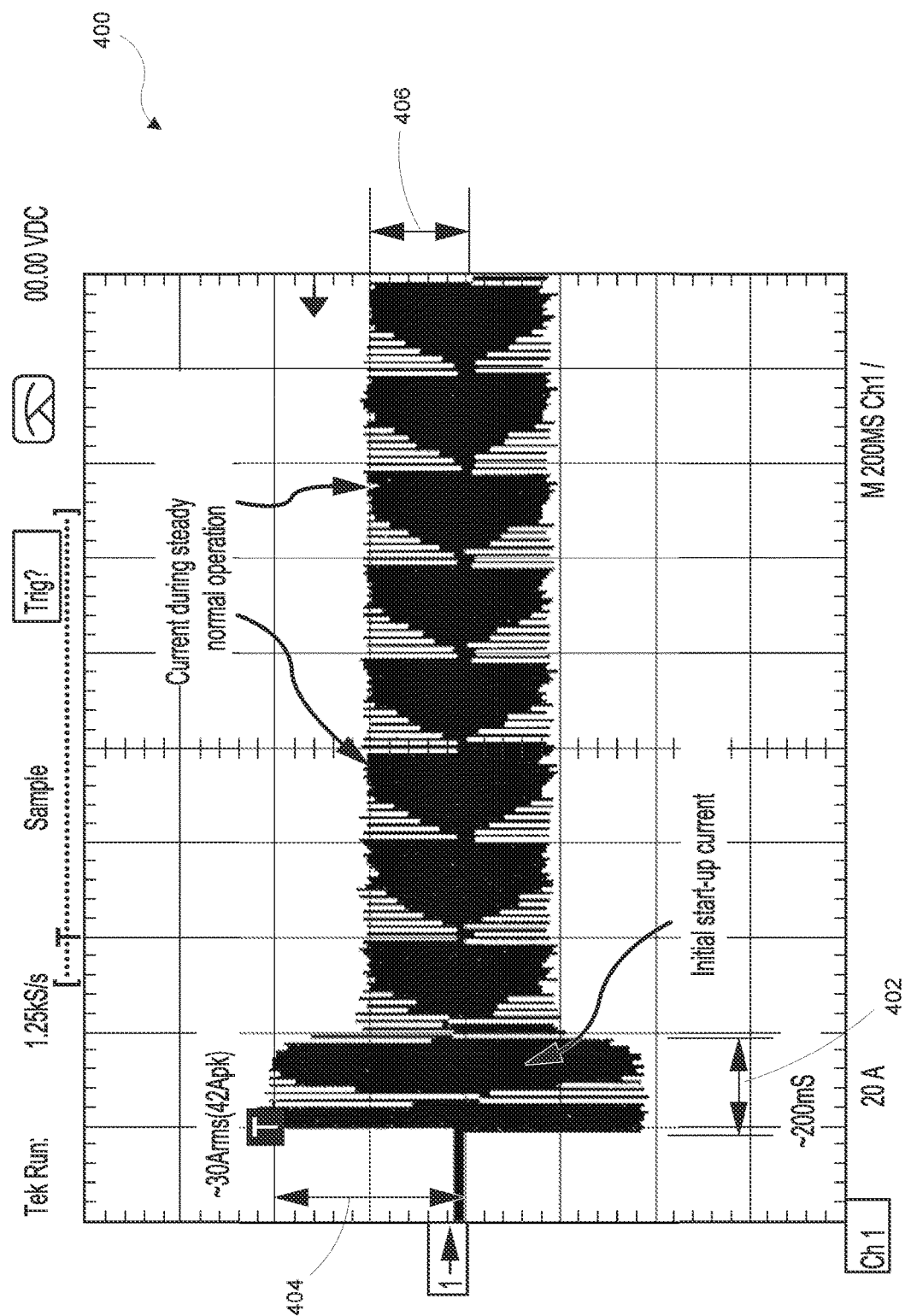
FIG. 6 is a graph illustrating the start-up current of a floor scraping machine.
Figure 7:
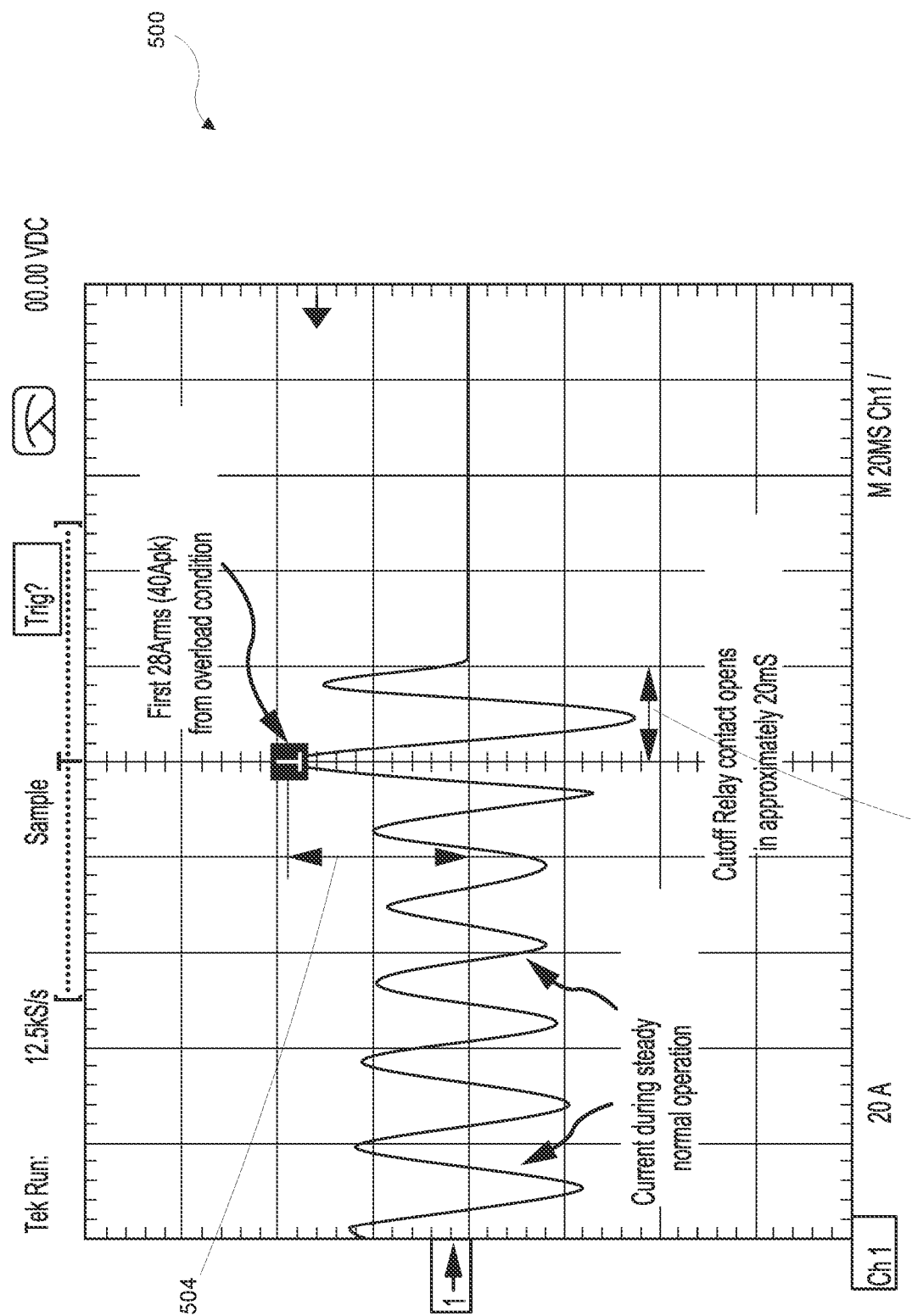
FIG. 7 is a graph illustrating an overload condition of a floor scraping machine.

FIG. 6 shows a graph 400 illustrating the start-up current 404 and normal operating current 406 (~20 Amps) for a representative floor scraping machine. As shown in the graph, the startup current 404 for this device is approximately 42 peak amps for a startup duration 402 of approximately 200 mS. This illustrates the need for a delay period (e.g., step 310) before overload detection begins at step 312. Although, one second is presented as a representative delay period, other delay periods can be used depending on the equipment and operating conditions. For example, in this graph 300 mS would provide sufficient time for startup. FIG. 7 shows a graph 500 illustrating an overload current 504 for a representative floor scraping machine. The cutoff delay 502 is approximately 20 mS, which is the time it takes for the cutoff relay 224 to deactivate once the current exceeds the threshold value.

Figure 8A:
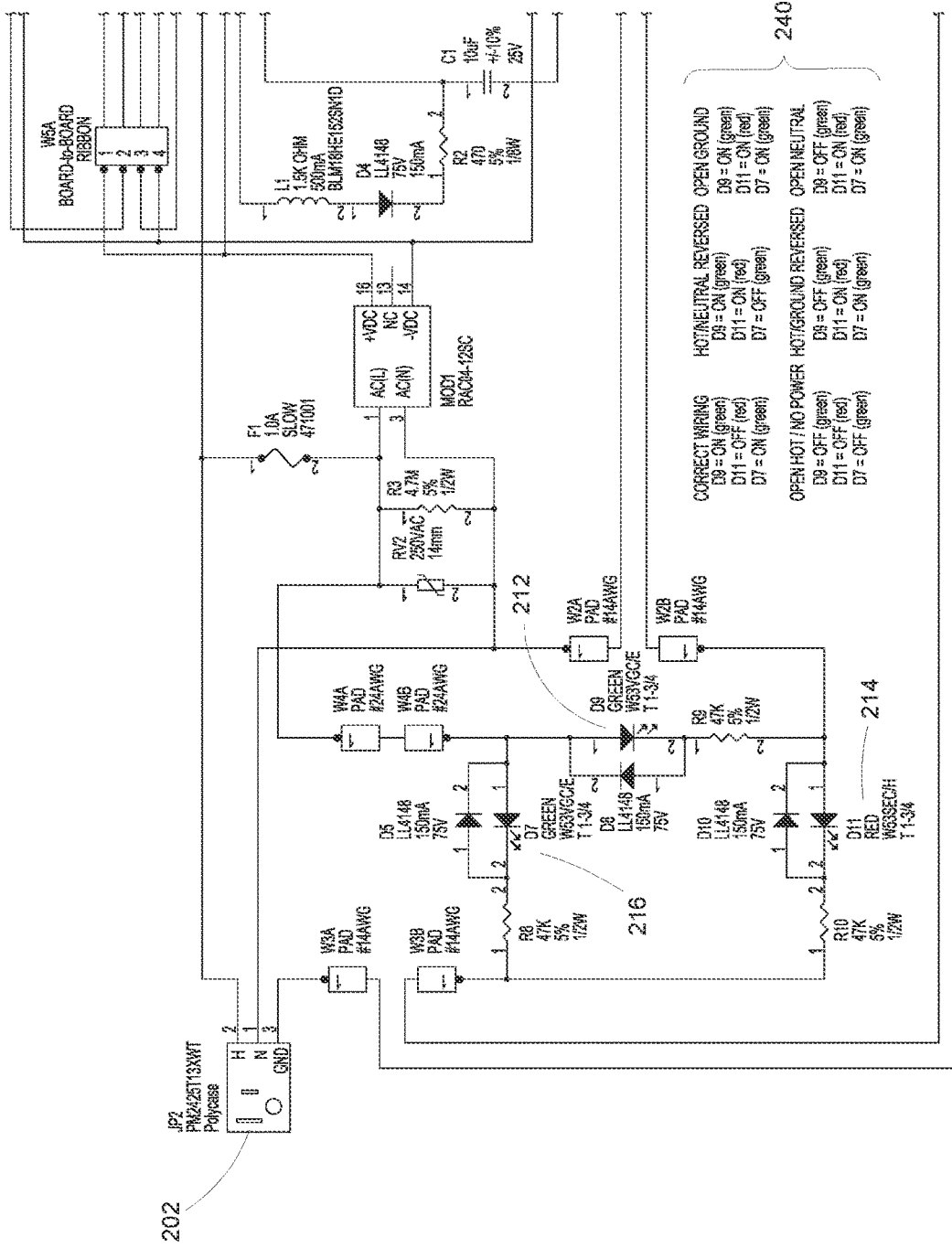
FIGS. 8A and 8B constitute a schematic diagram illustrating an example of an overload protection device's circuitry, in accordance with various aspects of the present disclosure.
Figure 8B:
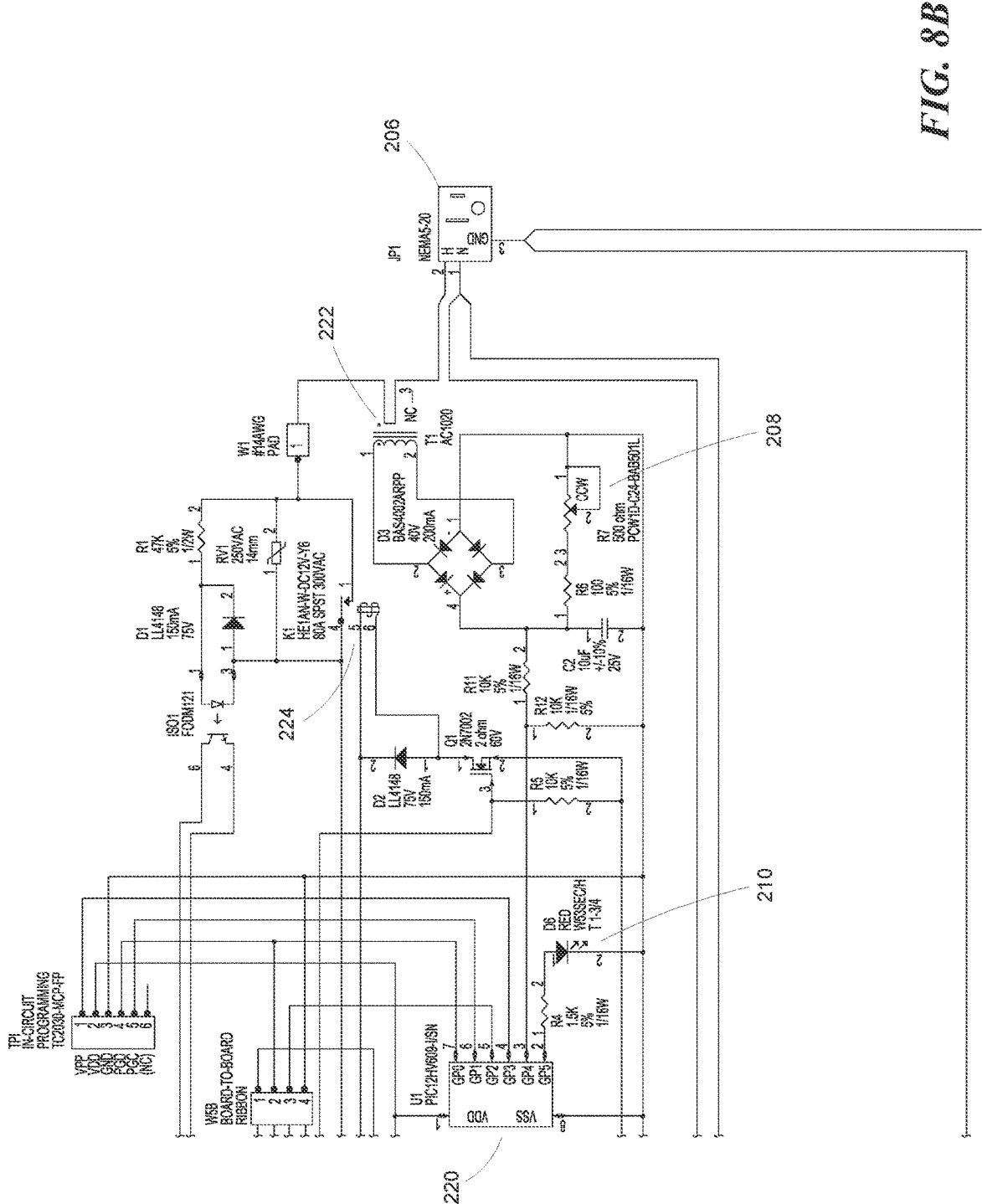

FIGS. 8A and 8B show a schematic block diagram of various circuit components of the representative overload control device 200 described herein. For example, FIG. 8A illustrates the components and circuitry associated with the power input 202 and the indicator lights 212, 214, and 216. The chart 240 indicates the status of each LED for indicating when the power connections are correct and various fault conditions. FIG. 8B illustrates the components and circuitry associated with power output 206, the over current limit adjuster 208, the overload indicator 210, the controller 220, the current sensor 222, and the cutoff relay 224.

Although, various time periods are presented herein for the startup, restart, and shutdown delay periods, other time periods can be used depending on the equipment and operating conditions. Although, various current values are presented herein for the startup, normal operation, overcurrent or spikes, other current values can be used depending on the equipment and operating conditions. Although the present technology is described with respect to floor scraping machines, the technology can be applied to other machines having rotating components.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A floor machine, comprising:
   an electric motor;
   a handle extending away from the electric motor;
   one or more operating triggers carried by the handle; and
   an overload control device, including:
   a power input connectable to a power source;
   a power output connected to the electric motor;
   a load detector operative to sense when the one or more operating triggers are engaged;
   a current sensor operative to sense a current value supplied to the motor via the power output;
   a cutoff relay interconnecting the power input and the power output, the cutoff relay operative to supply power from the power input to the power output when activated, and interrupt power supplied from the power input to the power output when deactivated; and
   a controller including instructions to:
     receive a load present indication from the load detector;
     activate the cutoff relay if a load is present in order to supply power to the electric motor;
     receive a current value from the current sensor;
     determine if the current value is greater than a selected threshold value;
     deactivate the cutoff relay when the current value is greater than the selected threshold value in order to interrupt the power supplied to the electric motor; and
     wait a predetermined restart delay period, during which the electric motor is prevented from restarting.

2. The floor machine of claim 1, wherein the controller further comprises instructions to wait a predetermined startup delay period between activating the cutoff relay and the step of receiving a current value from the current sensor.

3. The floor machine of claim 1, wherein the controller further comprises instructions to determine if the current value is less than a predetermined normal value, wait a predetermined shutdown delay period, and deactivate the cutoff relay.

4. The floor machine of claim 1, wherein the power input is connected to a wall outlet.

5. The floor machine of claim 1, further comprising a user adjustable potentiometer operative to select the threshold value.

6. The floor machine of claim 1, wherein the overload control device is carried by the electric motor.

7. An overload control device for use with a floor machine having an electric motor and one or more operating triggers, the overload control device comprising:
   a power input connectable to a power source;
   a power output connectable to the electric motor of the floor machine;
   a load detector operative to sense when the one or more operating triggers are engaged;
   a current sensor operative to sense a current value supplied to the motor via the power output;
   a cutoff relay interconnecting the power input and the power output, the cutoff relay operative to supply power from the power input to the power output when activated, and interrupt power supplied from the power input to the power output when deactivated; and
   a controller including instructions to:
     receive a load present indication from the load detector;
     activate the cutoff relay if a load is present in order to supply power to the electric motor;
     receive a current value from the current sensor;

determine if the current value is greater than a selected threshold value;

deactivate the cutoff relay when the current value is greater than the selected threshold value in order to interrupt the power supplied to the electric motor; and wait a predetermined restart delay period, during which the electric motor is prevented from restarting.

8. The overload control device of claim 7, wherein the controller further comprises instructions to wait a predetermined startup delay period between activating the cutoff relay and the step of receiving a current value from the current sensor.

9. The overload control device of claim 8, wherein the startup delay period is approximately one second.

10. The overload control device of claim 7, wherein the controller further comprises instructions to determine if the current value is less than a predetermined normal value, wait a predetermined shutdown delay period, and deactivate the cutoff relay.

11. The overload control device of claim 10, wherein the shutdown delay period is approximately one minute.

12. The overload control device of claim 7, wherein the power input is connected to a wall outlet.

13. The overload control device of claim 7, wherein the restart delay period is approximately five seconds.

14. The overload control device of claim 7, further comprising a user adjustable potentiometer operative to select the threshold value.

15. An overload control device, comprising:
a power input connectable to a power source;
a power output connectable to a load;
a load detector;
a current sensor;
a cutoff relay interconnecting the power input and the power output, the cutoff relay operative to supply power from the power input to the power output when activated, and interrupt power supplied from the power input to the power output when deactivated; and
a controller including instructions to:
receive a load present indication from the load detector;
activate the cutoff relay if a load is present in order to supply power to the load;
receive a current value from the current sensor;
determine if the current value is greater than a selected threshold value;
deactivate the cutoff relay when the current value is greater than the selected threshold value in order to interrupt the power supplied to the load; and
wait a predetermined restart delay period, during which the load is prevented from restarting.

16. The overload control device of claim 15, wherein the controller further comprises instructions to wait a predetermined shutdown delay period between determining that the current value is less than the normal value and deactivating the cutoff relay.

17. The overload control device of claim 16, wherein the shutdown delay period is approximately one minute.

18. The overload control device of claim 15, wherein the power input is connected to a wall outlet.

19. The overload control device of claim 15, wherein the restart delay period is approximately five seconds.

20. The overload control device of claim 15, further comprising a user adjustable potentiometer operative to select the threshold value.

* * * * *